US010395341B2

(12) United States Patent
Xie et al.

(10) Patent No.: US 10,395,341 B2
(45) Date of Patent: Aug. 27, 2019

(54) PANORAMIC IMAGE GENERATION METHOD AND APPARATUS FOR USER TERMINAL

(71) Applicant: BAIDU ONLINE NETWORK TECHNOLOGY (BEIJING) CO., LTD., Beijing (CN)

(72) Inventors: Guofu Xie, Beijing (CN); Rui Al, Beijing (CN); Li Liu, Beijing (CN); Wenbo Hou, Beijing (CN); Xianpeng Lang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 116 days.

(21) Appl. No.: 15/739,801

(22) PCT Filed: Nov. 19, 2015

(86) PCT No.: PCT/CN2015/095070
§ 371 (c)(1),
(2) Date: Dec. 26, 2017

(87) PCT Pub. No.: WO2017/000484
PCT Pub. Date: Jan. 5, 2017

(65) Prior Publication Data

US 2018/0365803 A1 Dec. 20, 2018

(30) Foreign Application Priority Data

Jun. 30, 2015 (CN) .......................... 2015 1 0377251

(51) Int. Cl.
*G06T 3/40* (2006.01)
*G06K 9/62* (2006.01)
(Continued)

(52) U.S. Cl.
CPC .......... *G06T 3/4038* (2013.01); *G06K 9/6202* (2013.01); *G06T 5/009* (2013.01); *G06T 5/50* (2013.01); *H04N 5/23238* (2013.01)

(58) Field of Classification Search
CPC ......... G06T 3/4038; G06T 5/50; G06T 5/009; G06K 9/6202; H04N 5/23238
(Continued)

(56) References Cited

U.S. PATENT DOCUMENTS 6,166,186 A * 12/2000 Ogawa .................. C07K 14/47 435/331
6,639,596 B1 10/2003 Shum et al.
(Continued)

FOREIGN PATENT DOCUMENTS

CN 101877140 11/2010
CN 103226822 7/2013
(Continued)

OTHER PUBLICATIONS

JPO, Office Action for JP Application No. 2017565747, dated Feb. 8, 2019.

(Continued)

*Primary Examiner* — Jerome Grant, II
(74) *Attorney, Agent, or Firm* — Hodgson Russ LLP

(57) ABSTRACT

The present disclosure provides a panoramic image generation method and apparatus for a user terminal. The panoramic image generation method for a user terminal includes: obtaining a plurality of images shot by a user terminal, determining an adjacence relationship among the plurality of images, and performing feature matching on adjacent images to obtain matched feature-point-pairs; obtaining an optimized camera parameter according to the matched feature-point-pairs and an initial camera parameter; performing a color adjustment on the adjacent images to
(Continued)

obtain color adjusted adjacent images; and mosaicking the color adjusted adjacent images according to the optimized camera parameter to generate a panoramic image.

18 Claims, 5 Drawing Sheets

(51) Int. Cl.
*G06T 5/00* (2006.01)
*G06T 5/50* (2006.01)
*H04N 5/232* (2006.01)

(58) Field of Classification Search
USPC .......................................................... 382/167
See application file for complete search history.

(56) References Cited

U.S. PATENT DOCUMENTS

| | | | | |
|---|---|---|---|---|
| 10,096,114 | B1* | 10/2018 | Lasenby | H04N 17/002 |
| 2006/0082644 | A1* | 4/2006 | Tsubaki | H04N 13/282 348/42 |
| 2008/0143820 | A1 | 6/2008 | Peterson | |
| 2010/0021065 | A1 | 1/2010 | Sibiryakov | |
| 2010/0289922 | A1 | 11/2010 | Brenner et al. | |
| 2014/0177968 | A1 | 6/2014 | Lee et al. | |
| 2017/0345184 | A1* | 11/2017 | Tsubota | G01B 11/245 |
| 2018/0365837 | A1* | 12/2018 | Fukuoka | G06T 7/13 |

FOREIGN PATENT DOCUMENTS

| | | |
|---|---|---|
| CN | 103793891 | 5/2014 |
| CN | 104143182 | 11/2014 |
| CN | 104992408 | 10/2015 |
| JP | 1115953 | 1/1999 |
| JP | 2013541884 | 11/2013 |
| JP | 2014068080 | 4/2014 |
| JP | 2014099087 | 5/2014 |

OTHER PUBLICATIONS

EPO, Office Action for EP Application No. 15897011, dated Dec. 21, 2018.
WIPO, ISR for PCT/CN2015/095070, Mar. 24, 2016.
SIPO, Office Action for CN App. No. 201510377251, dated Jul. 31, 2017.

* cited by examiner

PANORAMIC IMAGE GENERATION METHOD AND APPARATUS FOR USER TERMINAL

CROSS-REFERENCE TO RELATED APPLICATION

This application is a national phase entry under 35 U.S.C. § 371 of International Application No. PCT/CN2015/095070, filed Nov. 19, 2015, and claims priority to and benefits of Chinese Patent Application Serial No. 201510377251.6, titled with "panoramic image generation method and apparatus for user terminal", filed with the State Intellectual Property Office of P. R. China on Jun. 30, 2015 by Baidu Online Network Technology (Beijing) Co., Ltd., the entire content of which are incorporated herein by reference.

FIELD

The present disclosure relates to a field of image processing technology, and more particularly, to a panoramic image generation method and apparatus for a user terminal.

BACKGROUND

A panoramic image may be obtained by a wide-angle shot. However, limited by the hardware, most panoramic images are obtained by mosaicking a plurality of images such that surrounding environments may be shown as much as possible. In the related art, a panoramic image is generally obtained by mosaicking a plurality of images in following manners. One is a general mosaicking method which uses a scale-invariant feature transform (SIFT) feature and a bundle adjustment optimization to perform image mosaic, and another one is a mosaicking method for a mobile phone, in which movement tracks of the mobile phone can be recorded by an built-in sensor of the mobile phone to accelerate the image mosaic, or a color compensation and an illumination compensation can be performed on an overlapped area to improve quality of a mosaicked image.

However, both the general mosaicking method and the mosaicking method for a mobile phone have a low mosaicking speed.

SUMMARY

Embodiments of the present disclosure are to provide a panoramic image generation method for a user terminal which can improve an image mosaicking speed.

Embodiments of the present disclosure are to provide a panoramic image generation apparatus for a user terminal.

Embodiments according to a first aspect of the present disclosure provide a panoramic image generation method for a user terminal, which includes: obtaining a plurality of images shot by a user terminal, determining an adjacence relationship among the plurality of images, and performing feature matching on adjacent images to obtain matched feature-point-pairs; obtaining an optimized camera parameter according to the matched feature-point-pairs and an initial camera parameter; performing a color adjustment on the adjacent images, to obtain color adjusted adjacent images; mosaicking the color adjusted adjacent images according to the optimized camera parameter to generate a panoramic image.

Embodiments according to a second aspect of the present disclosure provide a panoramic image generation apparatus for a user terminal, which includes: a matching module, configured to obtain a plurality of images shot by a user terminal, to determine an adjacence relationship among the plurality of images, and to perform feature matching on adjacent images to obtain matched feature-point-pairs; an optimizing module, configured to obtain an optimized camera parameter according to the matched feature-point-pairs and an initial camera parameter; an adjusting module, configured to perform a color adjustment on the adjacent images to obtain color adjusted adjacent images; and a mosaicking module, configured to mosaic the color adjusted adjacent images according to the optimized camera parameter to generate the panoramic image.

Embodiments of the present disclosure also provide a user terminal, which includes: one or more processors, a memory, and one or more programs stored in the memory and configured to perform the method according to any one of the embodiments of the first aspect of the present disclosure when executed by the one or more processors.

Embodiments of the present disclosure also provide a non-transitory computer storage medium having stored therein one or more modules that, when executed, performing the method according to any one of the embodiments of the first aspect of the present disclosure.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

Above and/or additional aspects and advantages of the present disclosure will become apparent and more easily to understand from the following descriptions of the embodiments of the present disclosure with reference to the drawings.

DETAILED DESCRIPTION

Figure 1:
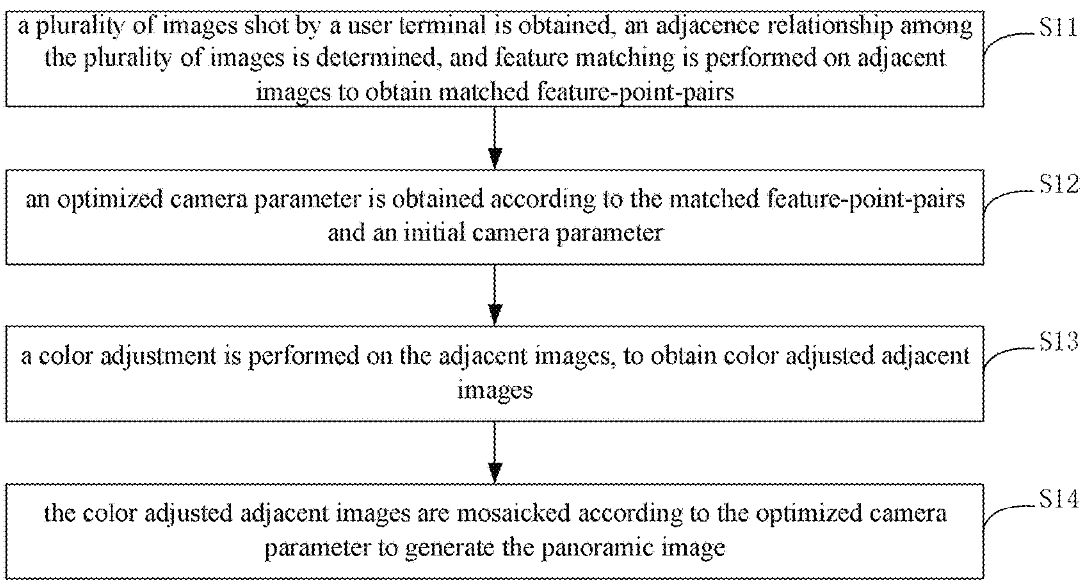
FIG. 1 is a flow chart of a panoramic image generation method for a user terminal according to an embodiment of the present disclosure.

Reference will now be made in detail to exemplary embodiments, examples of which are illustrated in the accompanying drawings, wherein the same or similar modules and the modules having same or similar functions are denoted by like reference numerals throughout the descriptions. Embodiments described herein with reference to drawings are explanatory and used to generally understand the present disclosure, and shall not be construed to limit the present disclosure. Instead, the embodiments of the present disclosure comprise all the variants, modifications and their equivalents within the spirit and scope of the present disclosure as defined by the claims.

FIG. 1 is a flow chart of a panoramic image generation method for a user terminal according to an embodiment of the present disclosure, the method includes following acts.

At block S11, a plurality of images shot by a user terminal is obtained, an adjacence relationship among the plurality of images is determined, and feature matching is performed on adjacent images to obtain matched feature-point-pairs.

Surrounding environments may be shot by a camera of the user terminal, so as to obtain a plurality of images in different states (for example an angle, illumination, etc.).

In an embodiment, in order to lower computation, only matching relationships among adjacent images are calculated, matching relationships among nonadjacent images are not calculated. Therefore, the adjacent images may be determined first.

Figure 2:
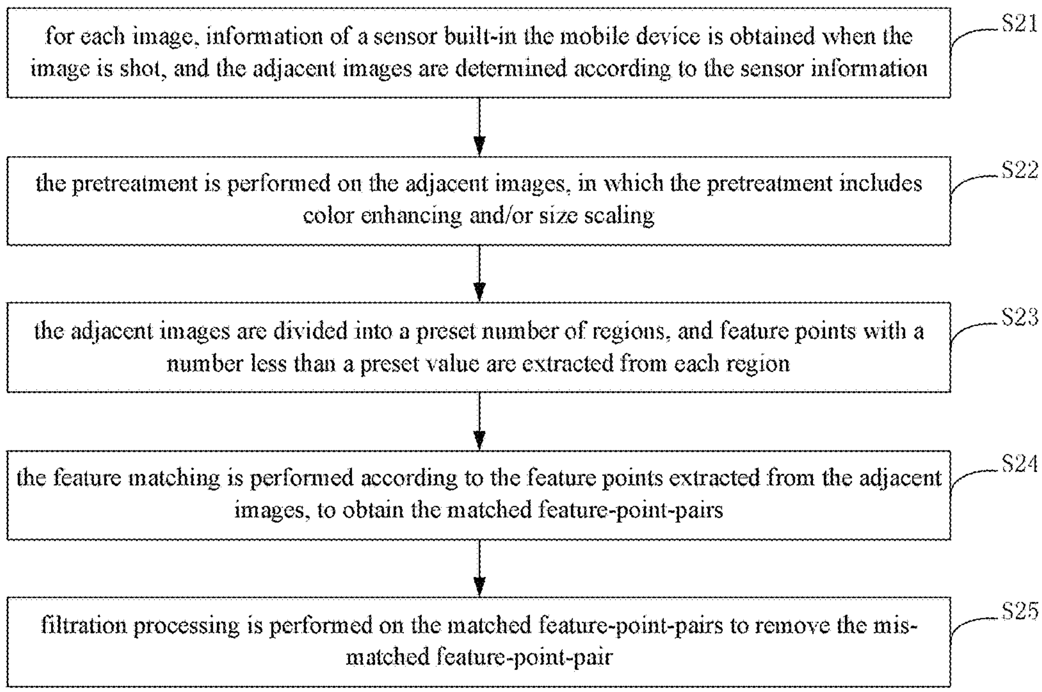
FIG. 2 is a flow chart of block S11 according to embodiments of the present disclosure.

Alternatively, taking the user terminal being a mobile device as an example, referring to FIG. 2, which is a flow chart of block S11, determining the adjacent images from the plurality of images may include following acts.

At block S21, for each image, information of a sensor built-in the mobile device is obtained when the image is shot, and the adjacent images are determined according to the sensor information.

For example, the sensor may be a gyroscope, a magnetometer, or a gravity sensor, etc.

For example, when each image is shot, sensor information corresponding to the image may be recorded and then the adjacent images are determined according to the information. For example, an angle corresponding to a first image is a first angle, an angle corresponding to a second image is a second angle, and an angle corresponding to a third image is a third angle. Assuming that a difference between the first angle and the second angle is less than a difference between the third angle and the first angle, it is determined that the first image and the second image are adjacent. Certainly, it should be understood that the above manner for determining the adjacent images is just a simplified example, and other manners may also be used for determining the adjacent images.

In this embodiment, by utilizing an apparatus built-in the mobile device, it can fully take advantage of resource of the mobile device, thus determining the adjacent images conveniently and quickly.

After the adjacent images are determined, feature extraction may be performed on each image in the adjacent images to accomplish the feature matching.

In an embodiment, with reference to FIG. 2, performing the feature matching on the adjacent images to obtain the matched feature-point-pairs may include following acts.

At block S23, each of the adjacent images is divided into a preset number of regions, and feature points with a number less than a preset value are extracted from each region.

For example, each of the adjacent images may be divided into 4 regions, and a certain number of feature points are extracted from each region.

The feature point may be a SIFT feature point.

At block S24, the feature matching is performed according to the feature points extracted from the adjacent images, to obtain the matched feature-point-pairs.

For example, matching of the SIFT feature points of the adjacent images may be performed using a random sample consensus (RANSAC) algorithm to obtain the matched feature-point-pairs.

In this embodiment, the computation may be cut down by limiting the number of the feature points, thus improving the mosaicking speed.

In an embodiment, a pretreatment may be performed on the images before the feature points are extracted, and/or some mis-matched feature-point-pairs may be removed after the feature-point-pairs are matched.

Referring to FIG. 2, the method may further include following acts.

At block S22, the pretreatment is performed on the adjacent images, in which the pretreatment includes color enhancing and/or size scaling.

The color enhancing refers to enhancing relatively dark images. For example, when a brightness value of a pixel in one image is less than a preset value, a preset increment may be added to the brightness value.

The size scaling refers to zooming an original image to a size suitable for the mobile device to process, in which, the size may be determined according to different kinds of the mobile device.

After the pretreatment, the feature extraction and the feature matching may be performed on the pretreated images, details of which may refer to above related descriptions, which will not be elaborated here.

In this embodiment, by the pretreatment, the process may be more effective and the images are suitable for the mobile device.

After the matched feature-point-pairs are obtained via the RANSAC, there may be a mis-matched feature-point-pair, therefore the mis-matched feature-point-pair can be removed after that.

In an embodiment, with reference to FIG. 2, the method may further include block S25.

At block S25, filtration processing is performed on the matched feature-point-pairs to remove the mis-matched feature-point-pair.

A heuristic algorithm may be used for the filtration processing.

For example, assuming that two feature-point-pairs are (A, B), (C, D), and (E, F) etc., then A may be connected to B to obtain a segment AB, similarly, a segment CD and a segment EF may be obtained. After that, these segments are compared, and feature-point-pairs corresponding to segments which basically have a same length and are parallel are remained, and other feature-point-pair(s) are removed. The removed feature-point-pair usually includes a mis-matched SIFT feature-point-pair which does not satisfy a basic parallel condition and wrong RANSAC inliers. Generally, these wrong RANSAC inliers do not satisfy a condition that lengths are basically same.

Filtered matched feature-point-pairs are obtained via the filtration processing, thereafter the matched feature-point-pairs used in later processing refer to the filtered matched feature-point-pairs.

With this embodiment, by the filtration processing, accuracy of the matched feature-point-pairs may be increased, thus increasing the accuracy of the image mosaic.

At block S12, an optimized camera parameter is obtained according to the matched feature-point-pairs and an initial camera parameter.

A bundle adjustment algorithm may be utilized to perform a global optimization on the camera parameter.

The bundle adjustment algorithm involves a nonlinear equation, and the camera parameter is optimized by minimizing a projection difference of all the matched feature-point-pairs among the images.

A Levenberg-Marquardt iteration algorithm may be used to obtain a solution in the bundle adjustment algorithm. Since nonlinear optimization is very sensitive to an initial value, if a given initial value is not appropriate, only a local optimal solution may be obtained, which may cause dislocation or ghost in a mosaicked panoramic image.

Figure 3:
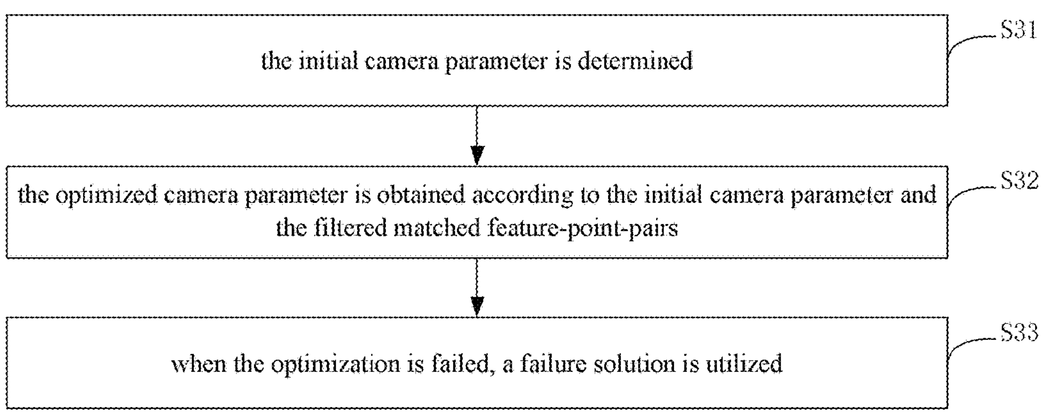
FIG. 3 is a flow chart of block S12 according to embodiments of the present disclosure.

Accordingly, in an embodiment, with reference to FIG. 3, the flow path of global optimization of the camera parameter may include following acts.

At block S31, the initial camera parameter is determined, in which determining the initial camera parameter includes a following act.

Information of the sensor built-in the mobile device when each image is shot is obtained, and the initial camera parameter is determined according to the information.

The camera parameter may include a focal length, a rotation matrix, etc.

In the related art, a stochastic initial value is taken as the initial camera parameter. But through an experiment, it is verified that the initial camera parameter obtained according to the sensor information according to the present embodiment may have a better optimal solution, thus reducing the dislocation and the ghost.

At block S32, the optimized camera parameter is obtained according to the initial camera parameter and the filtered matched feature-point-pairs.

For example, the Levenberg-Marquardt iteration algorithm may be used to obtain the optimized camera parameter.

In addition, when using the Levenberg-Marquardt iteration algorithm to obtain an optimized solution, there may be a circumstance that the optimization is failed (the algorithm is not convergent). There is no solution in the related art for a failed optimization, while in an embodiment of the present disclosure, with reference to FIG. 3, the method may further include block S33.

At block S33, when the optimization is failed, a failure solution is utilized. The failure solution includes following acts.

When the camera parameter optimization is failed, a pre-determined ideal camera parameter is taken as the initial camera parameter, and the optimization is performed again.

The ideal camera parameter may be determined by: determining an image format of each layer of the image shot by the user terminal (e.g. The mobile device), averagely estimating an angle of each image, and obtaining the ideal camera parameter according to the angle.

If the optimization is failed again, and each of the plurality of images includes three layers, a bottom layer is removed and the optimization is performed according to two upper layers.

When the optimization utilizing the ideal camera parameter as the initial camera parameter is failed again, the feature-point-pair(s) corresponding to parts of the images may be removed. For example, when the mobile phone is used for shooting, three layers of images may be usually obtained. In this embodiment, the bottom layer of images may be removed first and the upper two layers of images are optimized, such that it ensures that the two upper layers of images can be correctly mosaicked.

When the two upper layers of images are optimized, the optimization may also be performed according to feature-point-pairs of the two upper layers and the initial camera parameter. In addition, the initial camera parameter determined according to the sensor information according to this embodiment may be selected as the initial camera parameter first, and then the ideal camera parameter is selected.

If the optimization utilizing the two upper layers of images is failed, an optimization utilizing a middle layer of images is performed.

For example, when the two upper layers cannot be optimized, the middle layer of images can be ensured to be optimized and be mosaicked correctly. Hence here only feature-point-pairs corresponding to the middle layer of images and the initial camera parameter are utilized in computation. Also, when computing, the initial camera parameter determined according to the sensor information according to this embodiment may be selected as the initial camera parameter first, and then the ideal camera parameter is selected.

With this embodiment, by utilizing the initial camera parameter obtained according to the sensor information, the accuracy of the optimal solution is improved, thus improving the mosaicking effect. In addition, by utilizing the above processing solution after the optimization is failed, robustness is improved as well.

At block S13, a color adjustment is performed on the adjacent images, to obtain color adjusted adjacent images.

When shooting with a mobile phone, a parameter of each image, such as an exposure or a white balance, may be recalculated. Illumination changes at different regions of a scenario may lead to different exposures in the adjacent images. Meanwhile, objects of different colors in different parts of the scenario may also affect the white balance, thus leading to different appearances of a same object in the adjacent images, some being brighter, while some being darker. Without additional process on the color and the exposure, the color of an overlapped area in the panoramic image will be non-uniform. Therefore before the original images are mosaicked, a color compensation and an exposure compensation may be performed on the original images.

Figure 4:
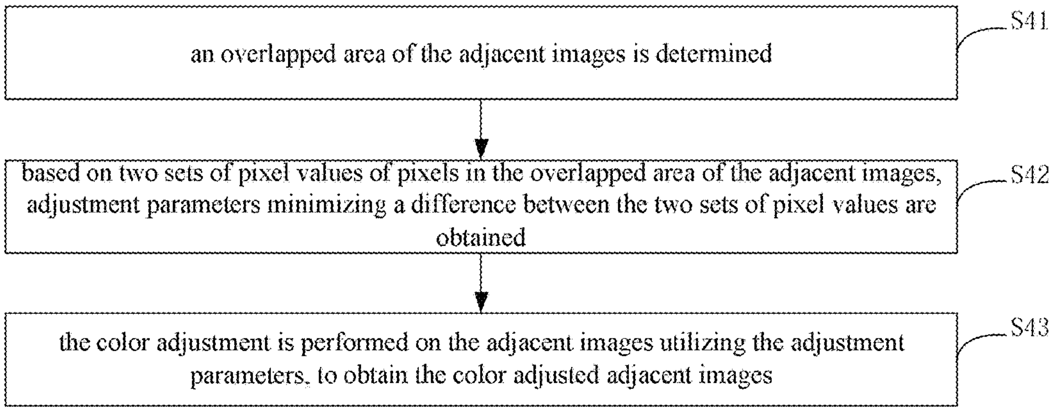
FIG. 4 is a flow chart of block S13 according to embodiments of the present disclosure.

In an embodiment, with reference to FIG. 4, performing the color adjustment on the adjacent images to obtain the color adjusted adjacent images may include following acts.

At block S41, an overlapped area of the adjacent images is determined.

Algorithms for determining an overlapped area of two images in the related art may be utilized.

At block S42, based on two sets of pixel values of pixels in the overlapped area of the adjacent images, adjustment parameters minimizing a difference between the two sets of pixel values are obtained.

For example, the adjacent images are A and B, and an overlapped area of A and B is D. Then a set of pixel values of pixel points in area D of image A and a set of pixel values of pixel points in area D of image B are obtained. After that, the adjustment parameters corresponding to A and B are obtained via a least square method when a difference between the two sets of pixel values is minimum. The adjustment parameters may be gamma adjustment parameters.

At block S43, the color adjustment is performed on the adjacent images utilizing the adjustment parameters, to obtain the color adjusted adjacent images.

For example, after the adjustment parameters corresponding to A and B are determined, the color adjustment may be performed on image A using the adjustment parameter corresponding to A, and the color adjustment may be performed on image B using the adjustment parameter corresponding to B.

With this embodiment, by the color adjustment, a non-uniform color situation in the panoramic image may be avoided.

At block S14, the color adjusted adjacent images are mosaicked according to the optimized camera parameter to generate the panoramic image.

After the camera parameter optimization and the color adjustment are performed on the adjacent images, the adjacent images may be mosaicked, to generate the panoramic image.

Figure 5:
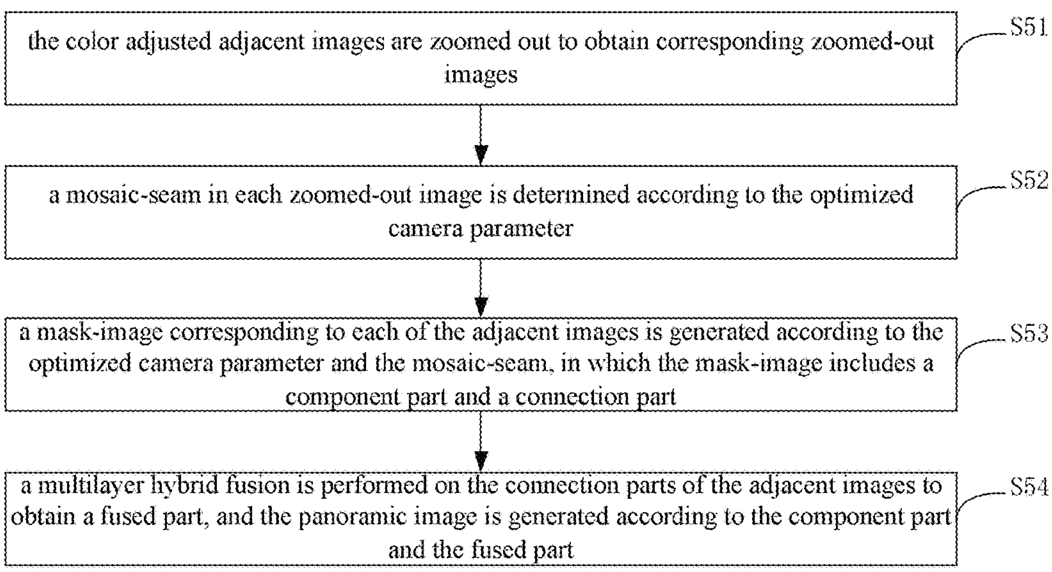
FIG. 5 is a flow chart of block S14 according to embodiments of the present disclosure.

In an embodiment, referring to FIG. 5, mosaicking the color adjusted adjacent images according to the optimized camera parameter to generate the panoramic image may include following acts.

At block S51, the color adjusted adjacent images are zoomed out to obtain corresponding zoomed-out images.

For example, each image of the adjacent images may be zoomed out to ⅛ of its original size.

At block S52, a mosaic-seam in each zoomed-out image is determined according to the optimized camera parameter.

After the image is determined, technologies in the related art may be used to determine the mosaic-seam in each image according to the adjacent images.

What is different from the related art is that, an image in an original size is usually utilized in the related art, while the original image is zoomed out and the mosaic-seam is determined in the zoomed-out image in this embodiment, thus realizing determining the mosaic-seam in a low resolution image, reducing workload and saving time.

At block S53, a mask-image corresponding to each of the adjacent images is generated according to the optimized camera parameter and the mosaic-seam, in which the mask-image includes a component part and a connection part.

A position of each image in the panoramic image may be determined according to the optimized camera parameter. After the position and the mosaic-seam are determined, the mask-image corresponding to an image may be determined. The mask-image includes a component part and a connection part.

Figure 6A:
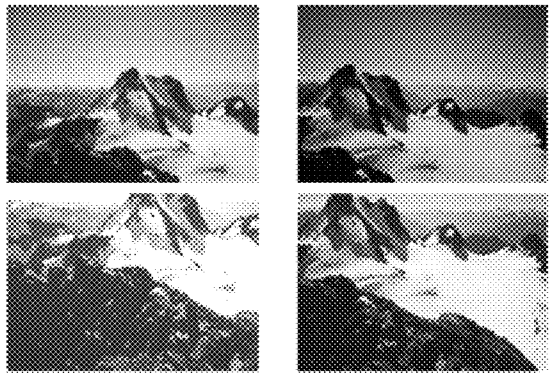
FIG. 6*a* is a schematic diagram illustrating images to be mosaicked according to embodiments of the present disclosure.
Figure 6B:
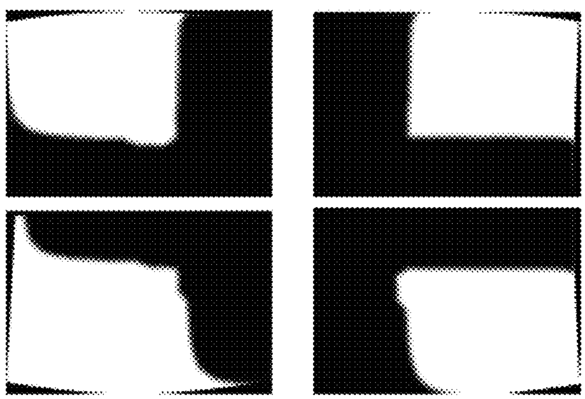
FIG. 6*b* is a schematic diagram illustrating mask images corresponding to the images according to embodiments of the present disclosure.

For example, four images to be mosaicked are shown as FIG. 6*a*. The mask-images corresponding to the four images may be shown in FIG. 6*b*, in which the component part is illustrated as a white area and the connection part is illustrated as a black area.

At block S54, a multilayer hybrid fusion is performed on the connection parts of the adjacent images to obtain a fused part, and the panoramic image is generated according to the component part and the fused part.

The component part of the mask-image may be directly used as a corresponding part of the panoramic image. Since there is an overlap in the connection parts of the adjacent images, the connection parts may be processed. In this embodiment, the multilayer hybrid fusion technology in the related art can be utilized and then the component part and the fused part constitute the panoramic image.

In addition, it should be noted that, the size of the mask-image is usually selected to be identical with a size (i.e. a same resolution) of the panoramic image, so that the panoramic image may be constituted by the component part and the fused part directly.

Figure 6C:
FIG. 6*c* is a schematic diagram illustrating a mosaicked panoramic image according to embodiments of the present disclosure.

For example, the mosaicked panoramic image may be as the image shown in FIG. 6*c*.

In an embodiment, when the mask-image and the panoramic image are of the same size, because the panoramic image are mosaicked in three-dimensional and shown in two-dimensional, when the panoramic image is shown, there may be a possible situation that the connection part of a mask-image of one image is very large, and the component part is scattered in two ends of the connection part. In this case the following process may be performed.

When the component part of the mask-image includes two parts which are scattered in two ends of the connection part, the mask-image is divided into two sub images, so that each sub image may be processed respectively.

For example, each of the sub images may be treated as an independent image in subsequent multilayer hybrid fusion and when the constituent part and the fused part are constituted.

With this embodiment, by dividing the mask-image into sub images, a processing time may be reduced. For example, 1~2 seconds may be saved for each mask-image, since there are usually 7~8 mask-images, the mosaicking speed may be significantly improved.

The above embodiments of the present disclosure may be used in image mosaicking for the mobile phone. It should be understood that the above solutions of the present disclosure may also be applied to other mobile devices, for example, applied in mosaicking in a vehicle-mounted system. Furthermore, in other scenarios, such as a vehicle-mounted scenario, the parameters may be adjusted according to an actual scenario.

With embodiments of the present disclosure, by determining the adjacent images and performing feature extraction on the adjacent images, the requirement of accuracy can be satisfied and workload for the feature extraction can be reduced, thus improving the image mosaicking speed. In addition, the above method according to embodiments of the present disclosure is suitable for the mobile device, by improvements of the pretreatment of the images, the feature matching, the global optimization, global color adjustment and the multilayer hybrid fusion, panoramic mosaicking of multilayer images may be quickly performed on the mobile device with a high quality. According to experiments, it shows that the success rate of mosaicking is larger than 80%, and the time is within 40 seconds. Furthermore, the solutions according to embodiments of the present disclosure may be applied to different kinds of user terminals to improve their performance.

Figure 7:
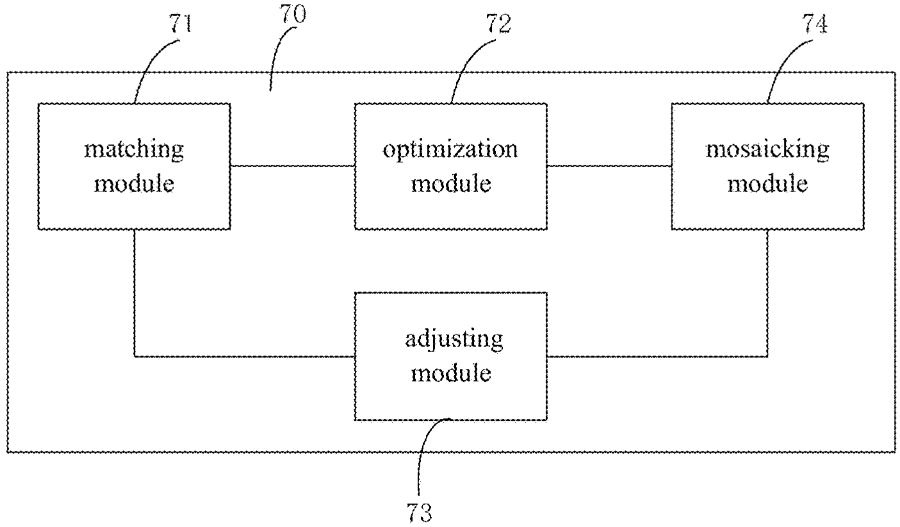
FIG. 7 is a block diagram of a panoramic image generation apparatus for a user terminal according to another embodiment of the present disclosure.

FIG. 7 is a block diagram of a panoramic image generation apparatus for a user terminal according to another embodiment of the present disclosure. The apparatus may be arranged in the user terminal, and may include a matching module 71, an optimization module 72, an adjusting module 73 and a mosaicking module 74.

The matching module 71 is configured to obtain a plurality of images shot by a user terminal, to determine an adjacence relationship among the plurality of images, and to perform feature matching on adjacent images to obtain matched feature-point-pairs.

Surrounding environments may be shot by a camera of the user terminal about surrounding environments, so as to obtain a plurality of images in different states (for example an angle, illumination, etc.).

In an embodiment, in order to lower computation, only matching relationships among adjacent images are calculated, matching relationships among nonadjacent images are not calculated. Therefore, the adjacent images may be determined first.

Alternatively, taking the user terminal being a mobile device as an example, determining adjacent images from the plurality of images by the matching module 71 may include following acts.

For each image, information of a sensor built-in the mobile device is obtained when the image is shot, and the adjacent images are determined according to the sensor information.

For example, the sensor may be a gyroscope, a magnetometer, or a gravity sensor, etc.

For example, when each image is shot, sensor information corresponding to the image may be recorded and then the adjacent images are determined according to the information. For example, an angle corresponding to a first image is a first angle, an angle corresponding to a second image is a second angle, and an angle corresponding to a third image is a third angle. Assuming that a difference between the first angle and the second angle is less than a difference between the third angle and the first angle, it is determined that the first image and the second image are adjacent. Certainly, it should be understood that the above manner for determining the adjacent images is just a simplified example, and other manners may also be used for determining the adjacent images.

In this embodiment, by utilizing an apparatus built-in the mobile device, it can fully take advantage of resource of the mobile device, thus determining the adjacent images conveniently and quickly.

After the adjacent images are determined, feature extraction may be performed on each image in the adjacent images to accomplish the feature matching.

Alternatively, the matching module 71 is configured to perform feature matching on the adjacent images to obtain matched feature-point-pairs by following acts.

Each of the adjacent images is divided into a preset number of regions, and feature points with a number less than a preset value are extracted from each region.

For example, each of the adjacent images may be divided into 4 regions, and a certain number of feature points are extracted from each region.

The feature point may be a SIFT feature point.

Feature matching is performed according to the feature points extracted from the adjacent images, to obtain matched feature-point-pairs.

For example, matching of the SIFT feature points of the adjacent images may be performed using a RANSAC algorithm to obtain the matched feature-point-pairs.

In this embodiment, the computation may be cut down by limiting the number of the feature points, thus improving the mosaicking speed.

In an embodiment, the matching module is further configured to pretreat the images before the feature points are extracted, and/or to remove some mis-matched feature-point-pairs after the feature-point-pairs are matched. Details may refer to descriptions of the method embodiments, which is not elaborated here.

The optimization module 72 is configured to obtain an optimized camera parameter according to the matched feature-point-pairs and an initial camera parameter.

A bundle adjustment algorithm may be utilized to perform a global optimization on the camera parameter.

The bundle adjustment algorithm involves a nonlinear equation, and the camera parameter is optimized by minimizing a projection difference of all the matched feature-point-pairs among the images.

A Levenberg-Marquardt iteration algorithm may be used to obtain a solution in the bundle adjustment algorithm. Since nonlinear optimization is very sensitive to an initial value, if a given initial value is not appropriate, only a local optimal solution may be obtained, which may cause dislocation or ghost in a mosaicked panoramic image.

Figure 8:
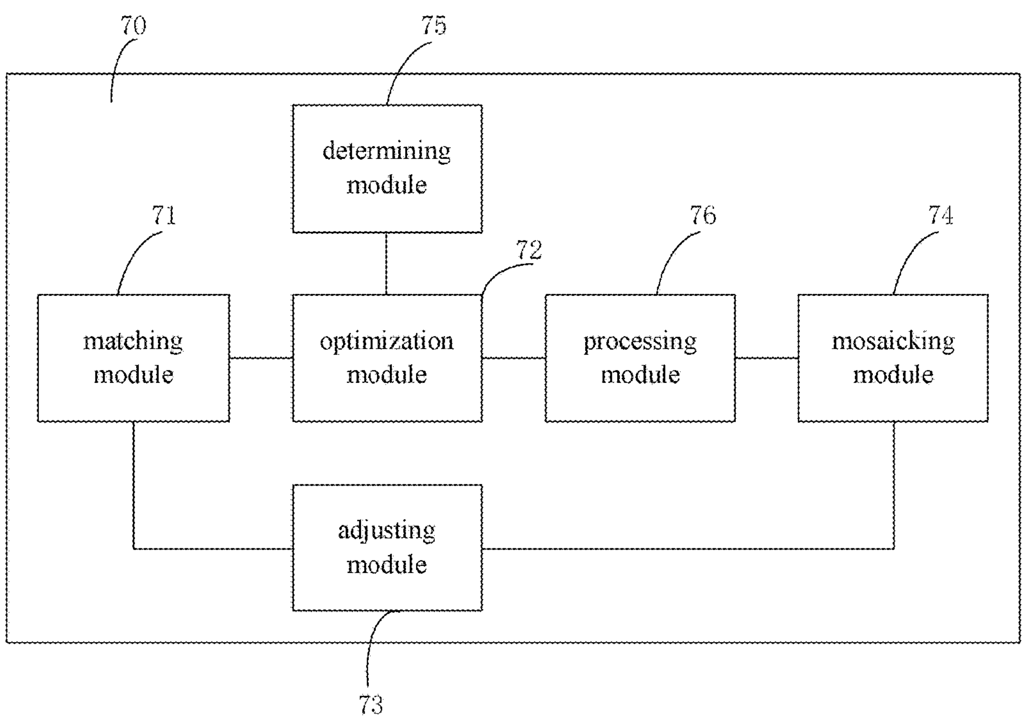
FIG. 8 is a block diagram of a panoramic image generation apparatus for a user terminal according to yet another embodiment of the present disclosure.

In an embodiment, with reference to FIG. 8, the apparatus 70 further includes a determining module 75 configured to determine the initial value. In detail, the determining module 75 is configured to obtain information of the sensor built-in the mobile device when each image is shot, and to determine the initial camera parameter according to the information.

The camera parameter may include a focal length, a rotation matrix, etc.

In the related art, a stochastic initial value is taken as the initial camera parameter. But through an experiment, it is verified that the initial camera parameter obtained according to the sensor information according to the present embodiment may have a better optimal solution, thus reducing the dislocation and the ghost.

In addition, when the Levenberg-Marquardt iteration algorithm is used to obtain an optimized solution, there may be a circumstance that the optimization is failed (the algorithm is not convergent). There is no solution in the related art for a failed optimization.

In an embodiment of the present disclosure, with reference to FIG. 8 the apparatus may also include a processing module 76 configured to take a pre-determined ideal camera parameter as the initial camera parameter, and to perform the optimization again when the camera parameter optimization is failed. If the optimization is failed again, and each of the plurality of images includes three layers, a bottom layer is removed and the optimization is performed according to two upper layers. If the optimization utilizing the two upper layers is failed, an optimization utilizing a middle layer of images is performed.

The ideal camera parameter may be determined by: determining an image format of each layer of the image shot by the user terminal (e.g. The mobile device), averagely estimating an angle of each image, and obtaining the ideal camera parameter according to the angle.

When the optimization utilizing the ideal camera parameter as the initial camera parameter is failed again, the feature-point-pair(s) corresponding to parts of the images may be removed. For example, when the mobile phone is used for shooting, three layers of images may be usually obtained. In this embodiment, the bottom layer of images may be removed first and the upper two layers of images are optimized, such that it ensures that the two upper layers of images can be correctly mosaicked.

When optimizing the upper two layers of images, the camera parameter may include a focal length, a rotation matrix, etc. The initial camera parameter determined according to the sensor information according to this embodiment may be selected as the initial camera parameter first, and then the ideal camera parameter is selected. For example, when the two upper layers cannot be optimized, the middle layer of images can be ensured to be optimized and be mosaicked correctly. Hence here only feature-point-pairs corresponding to the middle layer of images and the initial camera parameter are utilized in computation. Also, when computing, the initial camera parameter determined according to the sensor information according to this embodiment may be selected as the initial camera parameter first, and then the ideal camera parameter is selected.

With this embodiment, by utilizing the initial camera parameter obtained according to the sensor information, the accuracy of the optimal solution is improved, thus improving the mosaicking effect. In addition, by utilizing the above processing solution after the optimization is failed, robustness is improved as well.

The adjusting module 73 is configured to perform a color adjustment on the adjacent images, to obtain color adjusted adjacent images.

When shooting with a mobile phone, a parameter of each image, such as an exposure or a white balance, may be recalculated. Illumination changes at different regions of a scenario may lead to different exposures in the adjacent images. Meanwhile, objects of different colors in different parts of the scenario may also affect the white balance, thus leading to different appearances of a same object in the adjacent images, some being brighter, while some being darker. Without additional process on the color and the exposure, the color of an overlapped area in the panoramic image will be non-uniform. Therefore before the original images are mosaicked, a color compensation and an exposure compensation may be performed on the original images.

In an embodiment, the adjusting module 73 is specifically configured to determine an overlapped area of the adjacent images, to obtain an adjustment parameter which can minimize the difference between two sets of pixel values based on the two sets of pixel values of pixels in the overlapped area of the adjacent images, and to perform the color adjustment on the adjacent images utilizing the adjustment parameters, to obtain the color adjusted adjacent images.

Algorithms for determining an overlapped area of two images in the related art may be utilized.

For example, the adjacent images are A and B, and an overlapped area of A and B is D. Then a set of pixel values of pixel points in area D of image A and a set of pixel values of pixel points in area D of image B are obtained. After that, the adjustment parameters corresponding to A and B are obtained via a least square method when a difference between the two sets of pixel values is minimum. The adjustment parameters may be gamma adjustment parameters.

For example, after the adjustment parameters corresponding to A and B are determined, the color adjustment may be performed on image A using the adjustment parameter corresponding to A, and the color adjustment may be performed on image B using the adjustment parameter corresponding to B.

With this embodiment, by the color adjustment, a non-uniform color situation in the panoramic image may be avoided.

The mosaicking module 74 is configured to mosaic the color adjusted adjacent images according to the optimized camera parameter to generate the panoramic image.

After the camera parameter optimization and the color adjustment are performed on the adjacent images, the adjacent images may be mosaicked, to generate the panoramic image.

In an embodiment, the mosaicking module 74 is configured to perform following acts.

The color adjusted adjacent images are zoomed out to obtain corresponding zoomed-out images.

For example, each image of the adjacent images may be zoomed out to ⅛ of its original size.

A mosaic-seam in each zoomed-out image is determined according to the optimized camera parameter.

After the image is determined, technologies in the related art may be used to determine the technologies in each image according to the adjacent images.

What is different from the related art is that, an image in an original size is usually utilized in the related art, while the original image is zoomed out and the mosaic-seam is determined in the zoomed-out image in this embodiment, thus realizing determining the mosaic-seam in a low resolution image, reducing workload and saving time.

A mask-image corresponding to each of the adjacent images is generated according to the optimized camera parameter and the mosaic-seam, in which the mask-image includes a component part and a connection part.

A position of each image in the panoramic image may be determined according to the optimized camera parameter. After the position and the mosaic-seam are determined, the mask-image corresponding to an image may be determined. The mask-image includes a component part and a connection part.

For example, four images to be mosaicked are shown as FIG. 6*a*. The mask-images corresponding to the four images may be shown in FIG. 6*b*, in which the component part is illustrated as a white area and the connection part is illustrated as a black area.

A multilayer hybrid fusion is performed on the connection parts of the adjacent images to obtain a fused part, and the panoramic image is generated according to the component part and the fused part.

The component part of the mask-image may be directly used as a corresponding part of the panoramic image. Since there is an overlap in the connection parts of the adjacent images, the connection parts may be processed. In this embodiment, the multilayer hybrid fusion technology in the related art can be utilized and then the component part and the fused part constitute the panoramic image.

In addition, it should be noted that, the size of the mask-image is usually selected to be identical with a size (i.e. having the same resolution) of the panoramic image, so that the panoramic image may be constituted by the component part and the fused part directly.

For example, the mosaicked panoramic image may be as the image shown in FIG. 6*c*.

In an embodiment, the mosaicking module 74 is further configured to divide the mask-image into two sub images when the component part of the mask-image includes two parts which are scattered in two ends of the connection part, so that each sub image may be processed respectively.

For example, each of the sub images may be treated as an independent image in subsequent multilayer hybrid fusion and when the constituent part and the fused part are constituted.

With this embodiment, by dividing the mask-image into sub images, a processing time may be reduced. For example, 1~2 seconds may be saved for each mask-image, since there are usually 7~8 mask-images, the mosaicking speed may be significantly improved.

The above embodiments of the present disclosure may be applied in image mosaicking for the mobile phone. It should be understood that the above solutions of the present disclosure may also be applied to other user devices, for example, applied in mosaicking in a vehicle-mounted system. Furthermore, in other scenarios, such as a vehicle-mounted scenario, the parameters may be adjusted according to an actual scenario.

With embodiments of the present disclosure, by determining the adjacent images and performing feature extraction on the adjacent images, the requirement of accuracy can be satisfied and workload for the feature extraction can be reduced, thus improving the image mosaicking speed. In addition, the above method according to embodiments of the present disclosure is suitable for the mobile device, by improvements of the pretreatment of the images, the feature matching, the global optimization, global color adjustment and the multilayer hybrid fusion, panoramic mosaicking of multilayer images may be quickly performed on the mobile device with a high quality. According to experiments, it shows that the success rate of mosaicking is larger than 80%, and the time is within 40 seconds. Furthermore, the solutions according to embodiments of the present disclosure may be applied to different kinds of user terminals to improve their performance.

Embodiments of the present disclosure also provide a user terminal, which includes: one or more processors, a memory, and one or more programs stored in the memory and configured to perform the method according to any one of the embodiments of the first aspect of the present disclosure when executed by the one or more processors.

Embodiments of the present disclosure also provide a non-transitory computer storage medium having stored therein one or more modules, which when executed, performing the method according to any one of the embodiments of the first aspect of the present disclosure.

It should be noted that in the description of the present disclosure, terms such as “first” and “second” are used herein for purposes of description and are not intended to indicate or imply relative importance or significance or to imply the number of indicated technical features. In addition, in the description of the present disclosure, “a plurality of” means two or more than two, unless specified otherwise.

Any process or method described in a flow chart or described herein in other ways may be understood to include one or more modules, segments or portions of codes of executable instructions for achieving specific logical functions or steps in the process, and the scope of an embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated into a processing module, or these cells may be separate physical existence, or two or more cells are integrated into a processing module. The integrated module as described above may be achieved in a form of hardware, or may be achieved in a form of software functional module. When the integrated module is realized in a form of software function module and is sold or used as a standalone product, the integrated module may be stored in a computer-readable storage medium.

The storage medium mentioned above may be read-only memories, magnetic disks, CD, etc.

Reference throughout this specification to “an embodiment”, “some embodiments”, “an example”, “a specific example”, or “some examples” means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples.

Although embodiments of present disclosure have been shown and described above, it should be understood that above embodiments are just explanatory, and cannot be construed to limit the present disclosure, for those skilled in the art, changes, alternatives, and modifications can be made in the embodiments without departing from spirit, principles, and scope of the present disclosure.

What is claimed is:

1. A panoramic image generation method for a user terminal, comprising:

obtaining a plurality of images shot by a user terminal, determining an adjacence relationship among the plurality of images, and performing feature matching on adjacent images to obtain matched feature-point-pairs;

obtaining an optimized camera parameter according to the matched feature-point-pairs and an initial camera parameter;

performing a color adjustment on the adjacent images to obtain color adjusted adjacent images; and mosaicking the color adjusted adjacent images according to the optimized camera parameter to generate a panoramic image.

2. The method according to claim 1, wherein, performing feature matching on adjacent images to obtain matched feature-point-pairs comprises:

dividing each of the adjacent images into a preset number of regions, and extracting feature points with a number less than a preset value from each region;

performing the feature matching according to the feature points extracted from the adjacent images, to obtain the matched feature-point-pairs.

3. The method according to claim 1, further comprising:

when obtaining the optimized camera parameter is failed, taking a pre-determined ideal camera parameter as the initial camera parameter, and performing an optimization again;

when the optimization is failed again, and each of the adjacent images comprises three layers, removing a bottom layer from each adjacent image and performing the optimization according to two upper layers;

when the optimization according to the two upper layers is failed, performing the optimization utilizing a middle layer of each adjacent image.

4. The method according to claim 1, wherein, performing a color adjustment on the adjacent images to obtain color adjusted adjacent images comprises:

determining an overlapped area of the adjacent images;

based on two sets of pixel values of pixels in the overlapped area of the adjacent images, determining adjustment parameters minimizing a difference between the two sets of pixel values;

performing the color adjustment on the adjacent images utilizing the adjustment parameters, to obtain the color adjusted adjacent images.

5. The method according to claim 1, wherein, mosaicking the color adjusted adjacent images according to the optimized camera parameter to generate the panoramic image comprises:

zooming out the color adjusted adjacent images to obtain corresponding zoomed-out images;

determining a mosaic-seam in each zoomed-out image according to the optimized camera parameter;

generating a mask-image corresponding to each of the adjacent image according to the optimized camera parameter and the mosaic-seam, wherein the mask-image comprises a component part and a connection part;

performing a multilayer hybrid fusion on the connection parts of the adjacent images to obtain a fused part, and generating the panoramic image according to the component part and the fused part.

6. The method according to claim 5, further comprising:

when the component part of the mask-image comprises two parts scattered in two ends of the connection part, dividing the mask-image into two sub images, so that each sub image is processed respectively.

7. A panoramic image generation apparatus for a user terminal, comprising:

one or more processors;

a memory;

one or more software modules stored in the memory and executable by the one or more processors, and comprising:

a matching module, configured to obtain a plurality of images shot by a user terminal, to determine an adjacence relationship among the plurality of images, and to perform feature matching on adjacent images to obtain matched feature-point-pairs;

an optimizing module, configured to obtain an optimized camera parameter according to the matched feature-point-pairs and an initial camera parameter;

an adjusting module, configured to perform a color adjustment on the adjacent images to obtain color adjusted adjacent images; and a mosaicking module, configured to mosaic the color adjusted adjacent images according to the optimized camera parameter to generate the panoramic image.

8. The apparatus according to claim 7, wherein, the matching module is configured to perform feature matching on the adjacent images to obtain the matched feature-point-pair by:

dividing each of the adjacent images into a preset number of regions, and extracting feature points with a number less than a preset value from each region;

performing the feature matching according to the feature points extracted from the adjacent images, to obtain the matched feature-point-pairs.

9. The apparatus according to claim 7, further comprising:

a processing module configured to:

take a pre-determined ideal camera parameter as the initial camera parameter and perform an optimization again when obtaining the optimized camera parameter is failed;

remove a bottom layer from each adjacent image and perform the optimization according to two upper layers when the optimization is failed again and each of the adjacent images comprises three layers; and perform the optimization utilizing a middle layer of each adjacent image when the optimization based on the two upper layers is failed.

10. The apparatus according to claim 7, wherein, the adjusting module is configured to:

determine an overlapped area of the adjacent images;

based on two sets of pixel values of pixels in the overlapped area of the adjacent images, determine adjustment parameters minimizing a difference between the two sets of pixel values;

perform the color adjustment on the adjacent images utilizing the adjustment parameters, to obtain the color adjusted adjacent images.

11. The apparatus according to claim 7, wherein, the mosaicking module is configured to:

zoom out the color adjusted adjacent images to obtain corresponding zoomed-out images;

determine a mosaic-seam in each zoomed-out image according to the optimized camera parameter;

generate a mask-image corresponding to each of the adjacent image according to the optimized camera parameter and the mosaic-seam, wherein the mask-image comprises a component part and a connection part;

perform a multilayer hybrid fusion on the connection parts of the adjacent images to obtain a fused part, and generate the panoramic image according to the component part and the fused part.

12. The apparatus according to claim 11, wherein, the mosaicking module is configured to:

divide the mask-image into two smaller images when the component part of the mask-image comprises two parts and scattered in two ends of the connection part, so that each smaller image is processed respectively.

13. A non-transitory computer-readable storage medium, having stored therein one or more modules that, when executed, performing a panoramic image generation method for a user terminal, the panoramic image generation method for a user terminal comprising:

obtaining a plurality of images shot by a user terminal, determining an adjacence relationship among the plurality of images, and performing feature matching on adjacent images to obtain matched feature-point-pairs;

obtaining an optimized camera parameter according to the matched feature-point-pairs and an initial camera parameter;

performing a color adjustment on the adjacent images to obtain color adjusted adjacent images; and mosaicking the color adjusted adjacent images according to the optimized camera parameter to generate a panoramic image.

14. The storage medium according to claim 13, wherein, performing feature matching on adjacent images to obtain matched feature-point-pairs comprises:

dividing each of the adjacent images into a preset number of regions, and extracting feature points with a number less than a preset value from each region;

performing the feature matching according to the feature points extracted from the adjacent images, to obtain the matched feature-point-pairs.

15. The storage medium according to claim 13, further comprising:

when obtaining the optimized camera parameter is failed, taking a pre-determined ideal camera parameter as the initial camera parameter, and performing an optimization again;

when the optimization is failed again, and each of the adjacent images comprises three layers, removing a bottom layer from each adjacent image and performing the optimization according to two upper layers;

when the optimization according to the two upper layers is failed, performing the optimization utilizing a middle layer of each adjacent image.

16. The storage medium according to claim 13, wherein, performing a color adjustment on the adjacent images to obtain color adjusted adjacent images comprises:

determining an overlapped area of the adjacent images;

based on two sets of pixel values of pixels in the overlapped area of the adjacent images, determining adjustment parameters minimizing a difference between the two sets of pixel values;

performing the color adjustment on the adjacent images utilizing the adjustment parameters, to obtain the color adjusted adjacent images.

17. The storage medium according to claim 13, wherein, mosaicking the color adjusted adjacent images according to the optimized camera parameter to generate the panoramic image comprises:

zooming out the color adjusted adjacent images to obtain corresponding zoomed-out images;

determining a mosaic-seam in each zoomed-out image according to the optimized camera parameter;

generating a mask-image corresponding to each of the adjacent image according to the optimized camera parameter and the mosaic-seam, wherein the mask-image comprises a component part and a connection part;

performing a multilayer hybrid fusion on the connection parts of the adjacent images to obtain a fused part, and generating the panoramic image according to the component part and the fused part.

18. The storage medium according to claim 17, further comprising:

when the component part of the mask-image comprises two parts scattered in two ends of the connection part, dividing the mask-image into two sub images, so that each sub image is processed respectively.

* * * * *